United States Patent
Deloach

[15] 3,668,657
[45] June 6, 1972

[54] AUTOMATION CONTROL SYSTEM

[72] Inventor: Edwin R. Deloach, 7733 Dorsette Dr., New Orleans, La. 70128

[22] Filed: Nov. 21, 1969

[21] Appl. No.: 878,625

[52] U.S. Cl. ........................................................340/173 R
[51] Int. Cl..............................................................G11c 11/00
[58] Field of Search ...............................................340/173 R

[56] References Cited

UNITED STATES PATENTS

2,787,418  4/1957  MacKnight.............................340/347

*Primary Examiner*—Terrell W. Fears
*Attorney*—C. Emmett Pugh

[57] ABSTRACT

A pulse sampling multiplex system with analog capabilities including a modulating means necessary for direct recording on magnetic tape, an analog DC output, a direct DC output, an AC power output and a servomotor control output, a means for revising information on any channel without altering data on other channels, a "memory" means whereby information can be retained in the system after input data has been discontinued and a means for controlling direct DC and AC power output by punched tape or other parallel digital input means.

9 Claims, 13 Drawing Figures

EDWIN R. DELOACH
INVENTOR.

EDWIN R. DELOACH
INVENTOR.

EDWIN R. DELOACH
INVENTOR.

EDWIN R. DELOACH
INVENTOR

FIG. 13

EDWIN R. DELOACH
INVENTOR.

BY

AUTOMATION CONTROL SYSTEM

DESCRIPTION OF THE PREFERRED EMBODIMENT

The system of the present invention can be divided into three basic sections: the multiplex coding system, the multiplex decoding system and the output circuits. The coding system circuits are used in the decoding mode as part of the decoding system. Additionally the output circuits or commutator circuits are used in both modes of operation. The following theory description of the invention will deal with only one mode of operation at a time in order to provide a general understanding of the basic system theory. Following the description of the system theory, the circuit theory and operation will be explained in greater detail.

System Theory

Figure 1:
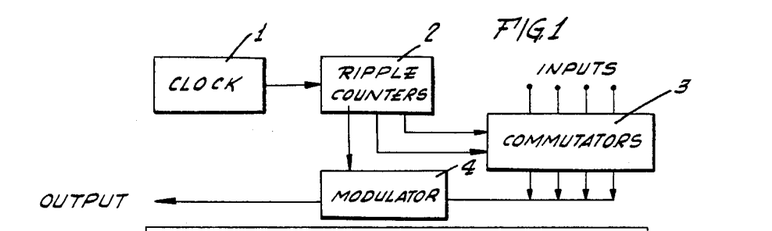
FIG. 1 is a schematic, block diagram of the multiplex coding system of the present invention.
Figure 3:
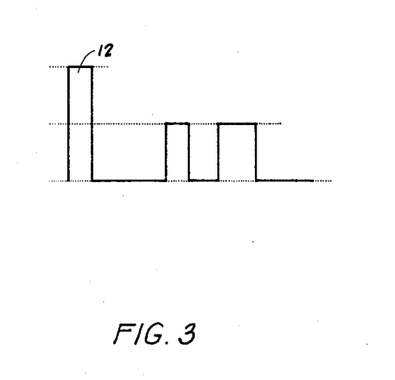
FIG. 3 is a graphical representation of a pulse train produced by the ripple counters and commutators of the system of the present invention.

The multiplex coding system of FIG. 1 consists of a clock generator 1 which in the coding mode can be merely a free running unijunction oscillator. The output pulse from the clock generator 1 is applied to the input of a series of flip-flops which form a binary "ripple" counter 2. The clock pulses are counted by the ripple counter 2 producing a different binary coded output for each count. This code is sensed by the AND gate of the commutators 3. For the number "1" channel commutator a binary code of 1 would gate the commutator "on." The number "2" commutator would be switched on when its AND gate was enabled by the binary code for "2." Each AND gate for each commutator is wired for the binary code corresponding to its channel position. In this way each step of the ripple counter 2 turns on a different commutator, sampling data from each channel in succession. The data produced would resemble a pulse train as illustrated in FIG. 3 with pulse heights corresponding to the voltage level sampled by the commutator for that channel. This pulse train of data (FIG. 3) is modulated by the modulator 4 before it leaves the system. This is done to provide a symmetrical shape to the pulse train, otherwise, processing of the signal by magnetic tape recording or transmitting media would create distortion and loss of the DC component of the signal. The modulating frequency is twice that of the pulse train or data sampling rate. This provides a modulation envelope like that shown in FIG. 4 when the pulse train of FIG. 3 is modulated. This is accomplished by alternately gating the pulse train signal in a balanced modulator fashion with a modulation signal derived from the first flip-flop stage of the ripple counter, which supplies the binary signal to the commutators 3. Because a signal is needed at all times for clock sync generation of the play back or coded signal before decoding can be accomplished, a small DC bias is added to the signal before it is modulated. This provides the low level AC signal seen in the modulated wave form of FIG. 4. Were it not for the small DC voltage being added, then the modulator would have no output when channels 1, 2 and 4 contained no voltage or signal level and sync would be lost.

Figure 4:
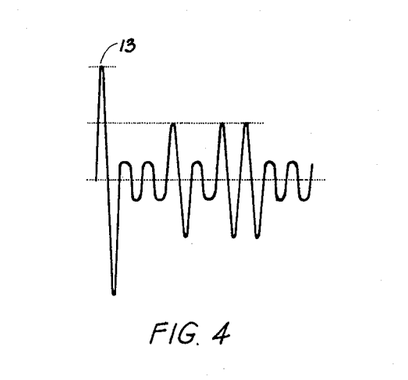
FIG. 4 is a graphical representation of the modulation envelope produced when the pulse train of FIG. 3 is modulated in the system of the present invention; the graph is also used to represent the signal fed into the decoding section to illustrate its operation.

The final modulated signal would appear as illustrated in FIG. 4. The "zero" channel commutator samples a signal of greater amplitude than any other channel. This pulse is then used as a frame reference or indexing point. The modulated signal of FIG. 4 is then applied to a magnetic tape recorder for recording.

Figure 2:
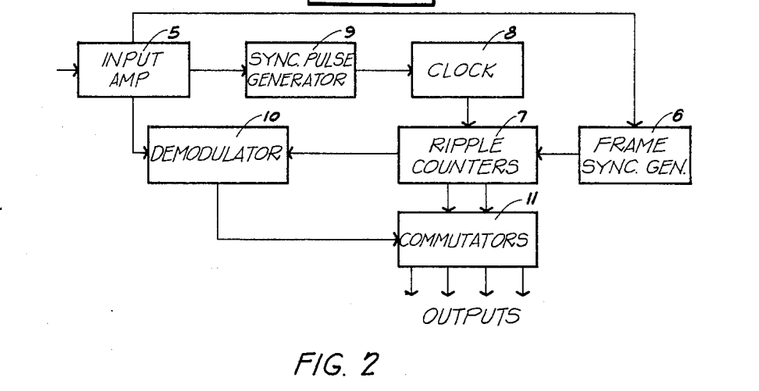
FIG. 2 is a schematic, block diagram of the multiplex decoding system of the present invention.

The multiplex decoding system of FIG. 2 decommutates the multiplexed signals and restores them to their original form and respective channel outputs. This process can perhaps be best understood by assuming that a signal like that of FIG. 4 is present at the input amplifier 5 of FIG. 2. This signal would be amplified to the necessary level and then be presented to the frame sync pick off circuit 6. This circuit 6 picks off the zero channel signal 13 which was recorded as a frame reference signal. This reference channel signal 13 has an amplitude greater than any other channel mentioned in the coding process described above. When this signal is sensed a reset pulse is generated by the circuit which would reset all flip-flops in the ripple counters 7 to the zero position. In this way frame sync is maintained and assured for each scan of the commutators. The sync pulse generator circuit 9 also processes the signal of FIG. 4 to provide a synchronization between the clock 8 and the input signal (FIG. 4). This synchronization is accomplished by limiting the signal amplitude of all channels to a level about equal to the amplitude of channel slots 1, 2 and 4. The signal then somewhat resembles a sine wave of relatively constant amplitude. The signal is then processed by a zero crossing detector circuit which generates a very fast and narrow pulse each time the signal crosses its zero voltage level. These pulses are applied to injunction transistor of the clock circuit 8 which maintains a sync between the clock frequency and the multiplex signal frequency. Thus it can be seen that the frame sync circuit 6 has set the counters 7 to the zero channel reference for the beginning of a scan by all commutators for each channel in succession, and the clock has been sychronized to the individual channel signals of FIG. 4. Thus with the system in sync the demodulator 10 reconstructs the signal to that of FIG. 3 by a reversal of the modulating process described in the multiplex coding system explanation above. Additionally each commutator in sequence samples the data for its channels at the proper moment. This sampled voltage level is stored on a capacitor which retains the signal level until the next sample which occurs during the next scan. Thus an output for each channel has been reconstructed.

There will now be disclosed five types of output circuits for use with the multiplex system of the present invention. Each output circuit is composed of a commutator with an AND gate and an output circuit characteristic of its function. Each output circuit type could be controlled with a signal applied directly to an input. For example, application of a signal voltage at this input would produce a DC control voltage at the output for the fixed DC output circuit and 110 volts AC or 220 volts AC for the AC power output circuits. Application of a variable amplitude signal would produce proportional output for the variable DC output circuits, the variable AC output circuit and the control signal necessary for a servo motor circuit. As these control signals are being applied to these output circuits, the commutator portion of the circuit is continually sampling and coding this signal storing this information on magnetic tape. During playback of the decoding mode of operation, these commutators are reconstructing these signals which control the output of these circuits identically to their operation during the programming or coding process.

Circuit Details

Only the basic circuits novel to this invention will be described here, the rest being well known in the art. Some circuits such as the ripple counters, power supply, and input amplifier, are commonly found in many application and their theory of operation is generally understood in the art.

Figure 5:
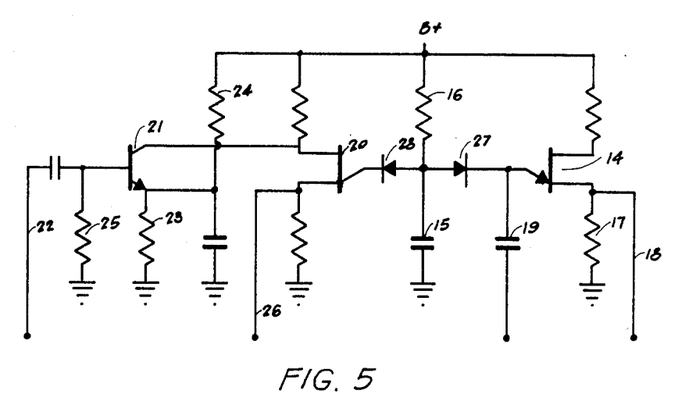
FIG. 5 is a schematic diagram of a novel circuit which serves as a clock oscillator and a frame sync detector in the system of the present invention.

The circuit of FIG. 5 provides the function of clock oscillator and frame sync detector.

In the multiplexing or coding mode of operation, only the unijunction transistor 14 and its associated components are used. In this mode of operation capacitor 15, resistor 16 and transistor 14 provide a relaxation oscillator whose frequency is determined by the time constant of the resistor 16, and the capacitor 15. Resistor 16 limits the current and consequently the changing time of capacitor 15. When a voltage level sufficient to trigger the unijunction transistor 14 into conduction occurs, the transistor 14 quickly turns on, discharging the capacitor 15 into resistor 17. The pulse applied across resistor 17 is connected through conductor 18 to the ripple counters 2. This process is repeated at a fast rate, usually about 10 kc.

In the playback mode of operation, a sync pulse is applied to the clock oscillator through capacitor 19 from the sync pulse generator 9. This signal synchronizes the clock with the pulses applied which are generated from the incoming multiplex signal.

The frame sync portion of the circuit of FIG. 5 is composed of transistors 20 and 21 and their associated circuitry. This circuit is used during playback or decoding mode of operation only. During operation the signal of FIG. 4 is applied to the input 22 of the circuit. Transistor 21 is reverse biased much beyond cut off due to the voltage divided at the emitter by resistors 23 and 24 and by the fact that the base is tied to the ground through resistor 25. This means that the signal of FIG. 4 is not amplified or passed by the transistor 21 until a voltage sufficient to forward bias the base-emitter is sensed. This forward bias occurs only at the extreme peaks of the "zero" channel pulse 13. In this way the "zero" channel signal, which is always recorded with greater amplitude than any other channel, is used as a reference for synchronizing the frame scans. Transistor 21 which conducts only at this time, generates a signal at unijunction transistor 20.

When transistor 20 is triggered "on" it discharges capacitor 15 "stealing" the pulse from the clock oscillator transistor 14. The pulse then takes a different path through transistor 20 and conductor 26 to the reset input of the ripple counter 7. This pulse sets all counter stages to the "zero" position. The diodes 27 and 28 isolate the clock oscillator circuit from the frame sync circuit and yet provide a means of disabling the clock at the moment a frame sync pulse is generated.

Figure 6:
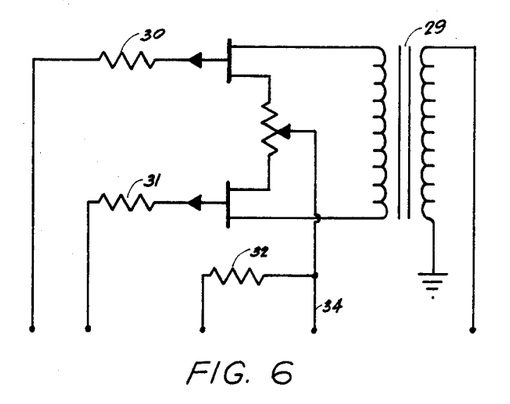
FIG. 6 is a schematic diagram of a novel circuit for performing the modulation and demodulation in the system of the present invention.

The modulation-demodulation circuit of FIG. 6 modulates the pulse train of signals (FIG. 3) which is derived from the commutators so that the modulated appearance resembles that illustrated in FIG. 4. This is accomplished by alternately gating the signal, twice for each channel pulse, through the transformer 29. The modulating drive signal is derived from the first counter stage or flip-flop of the ripple counters 2. The gate signal passes through resistor 30 from one half of the flip-flop and resistor 31 from the other half. This alternate application of a square waves gates one FET transistor off while the other is on and vice versa.

A small current is applied through resistor 32 to provide an output signal from the modulator for the time periods when no signal is present for a channel or channels. This is done as some signal is always necessary to keep the system in sync during playback or decoding. During the decoding mode the exact opposite occurs in the modulator. The signal of FIG. 4 applied at point 33, is synchronously demodulated and appears at point 34 as shown in FIG. 6.

Figure 7:
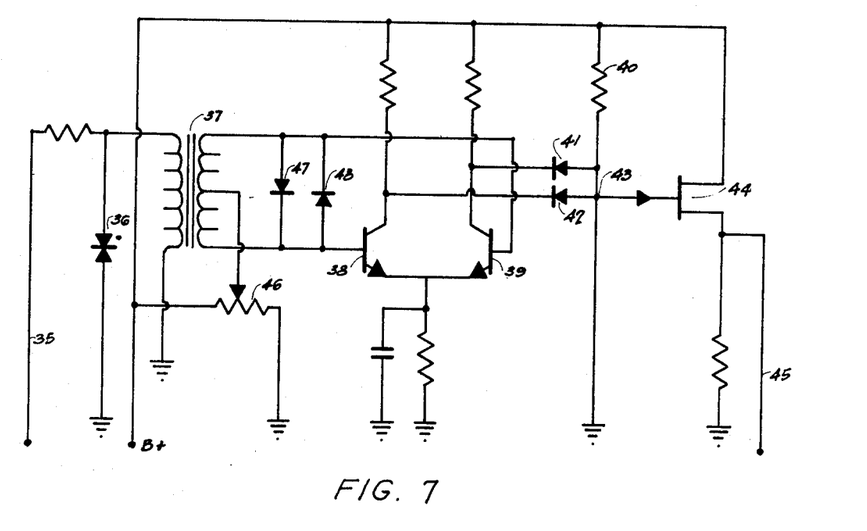
FIG. 7 is a schematic diagram of a novel circuit which serves as a clock sync generator in the system of the present invention.

The clock sync generator circuit of FIG. 7 is used in the decoder playback mode in order that a synchronization can be maintained between the input signal and the clock oscillator. Operation of this circuit is as follows. An input signal similar to FIG. 4 is applied to the input 35 from the input amplifier. This signal is limited in amplitude or clipped by the zener diode 36. The signal is then coupled through transformer 37 and applied to the differential amplifier composed of transistors 38 and 39. Effectively one of these transistors are in a state of conduction at all times except for a quick instant when the signal crosses over at the zero voltage level transferring the signal from one of these transistors to the other. During this instant no current is drawn by the transistors and, consequently, from resistor 40, through diodes 41 and 42. This effect allows a voltage to appear at point 43. This voltage, appearing as a narrow, fast pulse, is amplified or "buffered" by the FET transistor 44. This signal is then connected from point 45 to the clock generator 8. This circuit effectively produces an output pulse each time the input signal crosses zero potential. Potentiometer 46 adjusts the DC level on the bases of transistors 38 and 39 affecting the output pulse amplitude and width. Diodes 47 and 48 further limit or clip the input signal improving the over-all operation.

Figure 8:
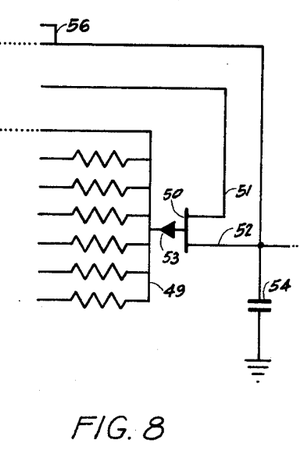
FIG. 8 is a schematic diagram of a novel circuit which provides the commutating-decommutating function in the system of the present invention.

The commutator illustrated in FIG. 8 is composed of resistors 49 and FET transistor 50. The transistor 50 turns "on" providing a current path from the source 51 to drain 52 terminal when the gate 53 voltage is at ground potential or below the pinch off voltage rating for the device. This occurs only when each of the resistors 49 which make up the AND gate for the transistor are taken to zero or ground potential. Should only one of the resistors have a signal (a positive voltage) the voltage seen at the gate of the transistor will be high enough to hold the transistor in the "off" condition. Each resistor is connected to the "O" or "I" output of flip-flops which compose the ripple counters. If six resistors are connected to the "O" outputs of each flip-flop stage the transistor would be switched on for the "zero" channel slot. Should each resistor be connected to the "O" output of the flip-flop with the last stage connected to the "I" output the transistor would commutate during the binary count of "32" or during channel slot number "32." Should all the resistors be connected to the "I" outputs of the flip-flop, a channel position of "64" would be commutated. The source terminal 51 of the transistor on all commutators are connected in common. This multiplex common line carries the pulse train, FIG. 3, from all the commutators to the modulator. The train terminal 52 is used to supply a signal when recording or in the coding mode and provides a point to extract the reconstructed signal during playback or decoding mode of operation. The capacitor 54 is needed to retain the signal voltage level during periods between samples or commutations.

Figure 9:
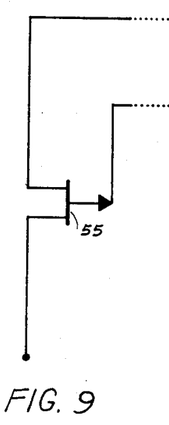
FIG. 9 is a schematic diagram of a commutator transistor circuit used to recommutate the signal decommutated by the main commutating circuit of the present invention.

FIG. 9 merely adds another commutation circuit by the addition of transistor 55. The source terminal of transistor 55 is connected to the source terminal of transistor 50 and the gate of transistor 50 is connected to the gate of transistor 55. The drain terminal of transistor 55 is then connected to a second modulation circuit. With this circuit arrangement a signal which is being received by the commutator can be corrected by overriding the input 56 with a low impedance signal source. This signal would then be commutated by transistor 55 and then be modulated and recorded as changed on a second track of the tape recorder. If no alterations for that channel is desired no signal source is connected to the input and the signal being recommutated will be the same as is being decommutated and stored on the capacitor 54. From this explanation it should be understood that the playback or decoding is being provided by transistor 50, and at the same time commutation or recoding of the signal just decommutated is taking place and is being rerecorded on a second track of the tape recorder. Any changes made on the program is of course recorded as changed in this way.

Figure 10:
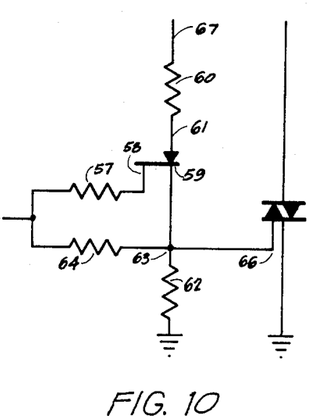
FIG. 10 is a schematic diagram of a novel circuit which applies power to an output load when a signal is applied to its input and provides a memory system to continue providing such output until a signal is applied to "turn off" the circuit.

The circuit of FIG. 10 provides a DC output suitable for operating small loads as lamps relay, etc. This circuit has the advantage that once a signal turns the "circuit" on it remains on "remembering" this command until an off command is given. Operation is as follows: When a signal is decommutated by transistor 50 and stored on capacitor 54 a small amount of current flows through resistor 57 into the gate 58 of the SCR transistor 59. This minute current turns the SCR on providing a current path through the load 60, SCR anode 61 out the cathode and through resistor 62 to ground. Resistor 62 is chosen in value so that the voltage drop across it will be approximately 2 volts when this current is passed. When this occurs current flow from point 63 through resistor 64, replacing the charge on the capacitor 54. When the current through the SCR goes to zero the SCR transistor 59 turns off. This occurs for each cycle of the pulsating DC anode voltage. Then with the charge having been replaced on the capacitor 54, the "turn on" process repeats itself indefinitely, even if commutation is discontinued. When the commutator senses a signal of zero potential, the charge is conducted off the capacitor 54 through the FET transistor 50. With no charge on the capacitor it is not possible for the SCR transistor 59 to turn on during the next cycle of its anode supply voltage. In this way the circuit switches off and remains off. Resistors 57 and 64 are chosen in value so as not to discharge the capacitor too much during turn "on" yet return enough current to the capacitor after turn "on" occurs. For fixed AC power control the circuit thus far described can be used to trigger an AC power type TRIAC transistor 65. With this addition to the circuit, a signal could be taken from the cathode 63 of the SCR transistor so that, when it is "on," a signal is applied into the gate 66 of the TRIAC 65. In this way AC power can be supplied to a load connected from the TRIAC anode 65 to some AC power source when a signal is provided from the SCR transistor cathode 63.

In some applications it is desirable to eliminate as much radio interference as possible. The system heretofore described eliminates most RFI as there is no mechanical contacts at arc during switching. Complete elimination of RFI is possible by switching the TRIAC on only at the beginning of an AC power cycle. This can be accomplished very easily by applying an anode supply voltage composed of pulses synchronized with the beginning of each AC power cycle to the SCR anode supply point 67. This modification may require that resistor 64 be substituted for by a diode to provide a quick charge path to the capacitor 54. Otherwise the duty cycle of the pulse appearing across resistor 62 would be to small to replace the charge taken from the capacitor.

Figure 11:
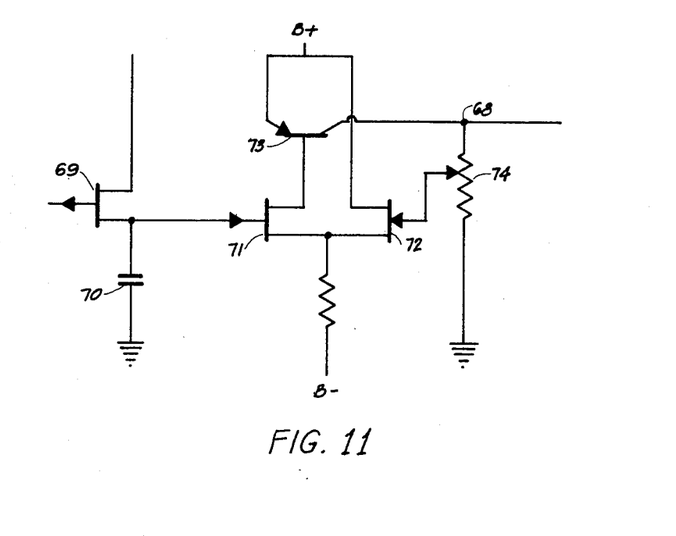
FIG. 11 is a schematic diagram of a commutator buffer amplifier which isolates the signal stored in the commutator output capacitor from an output load and prevents the commutator capacitor from discharging, thus loosing the signal between commutations.

For some applications it will be necessary to isolate the triac 65 and its associated AC circuitry from the control circuitry of transistors 50 and 59. In such an instance the signal may be applied through an isolation transformer. The primary winding of the isolation transformer will be substituted in place of resistor 62 and the secondary winding of the transformer will be connected to the gate 66 and the cathode of TRIAC 65. The DC output circuit of FIG. 11 provides a buffered signal to the output 68 from the decommutator transistor 69. This signal can be voltage amplified, if desired, by use of the potentiometer or pot 74. The decommutated signal stored on capacitor 70 is amplified by the differential amplifier composed of transistors 71 and 72. These transistors present a very high impedance at their gate terminal and for that reason will not alter the voltage level stored on capacitor 70. Transistor 73 provides an output across potentiometer or pot 74. Feed back from the circuit is provided from the tap on potentiometer 75 to the gate of transistor 72. This provides the circuit with negative feedback and output sensing which in turn provides the circuit with very high stability.

The servomotor output circuit is used to provide variable drive power to control a servo motor or other servo mechanism. Input to the servo amplifier is provided from a commutator and buffer amplifier circuit as described above in the DC signal output circuit explanation. The buffered signal is then applied at the input 76 of FIG. 12. This signal is compared by the differential amplifier composed of transistors 78 and 79 against the signal at input 77. The signal of input 77 is generated by the feedback potentiometer 80 which is usually mechanically coupled to the servo motor or mechanism moved by the servo motor. Any unbalance between the two inputs is amplified resulting in an increase of current through resistors 84 and 83 and a decrease of current through resistors 81 and 82, or vice-versa depending on which direction the unbalance occurs and consequently the polarity difference at the two inputs 76 and 77.

Figure 12:
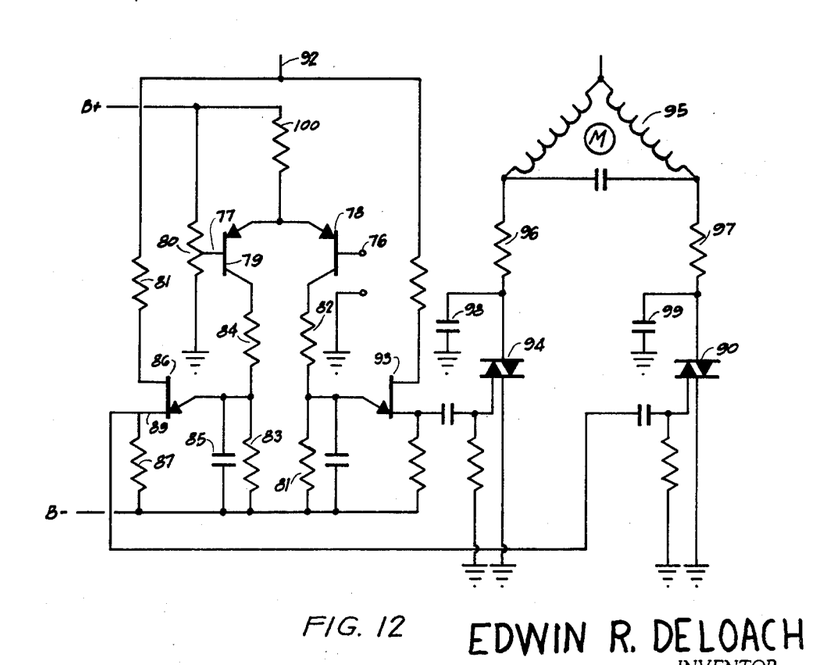
FIG. 12 is the schematic diagram of a servo motor control circuit.

Assuming the unbalance occurs in a direction resulting in a decrease of current through resistors 83 and 84, a decrease in the charging time of capacitor 85 will result. This resistor and capacitor is part of the unijunction relaxation type oscillator also composed of the transistor 86 and resistors 87 and 88. This oscillator circuit produces trigger pulses at point 89 when the transistor discharges capacitor 85. These trigger pulses are applied to the gate of the triac transistor 90 which provides the signal necessary to turn the triac into conduction. With a balanced signal at the inputs 76 and 77, the charging time of the unijunction oscillator is such that a pulse appears at the triac at the completion of each AC cycle. This switches the triac "on" at the end of the cycle resulting in very little or no output power to the servo motor winding. This output trigger pulse is synchronized to the power line frequency, usually 60 CPS, by the base 91 being supplied with an unfiltered but rectified DC signal from point 92. Each time the voltage drops from the pulsation of the unfiltered supply, transistor 86 switches "on" discharging the capacitor at the completion of the AC cycle.

On the contrary, if an unbalance occurs at the inputs of 76 and 77 which increases the current through 83 and 84, the charging time of capacitor 85 decreases and provides an output pulse to trigger the triac transistor "on" before the completion of the AC power cycle. Thus the triac turns "on" applying power to the winding of the servo motor for the duration between the time of the trigger pulse and the end of the AC cycle. This process continues for each cycle of the AC as long as the unbalance remains. If the unbalance further increases the power to the servo motor winding increases by fact the trigger pulse is further advanced perhaps to the point where a trigger pulse occurs at the beginning of each AC cycle. In this case the triac transistor 90 would turn on at the start of each cycle providing 100 percent power to its load. In this way it can be understood that an output is developed that is proportional to the unbalance at the input which can vary from 0 to 100 percent.

The opposite half of the circuit of FIG. 12 composed of transistors 93 and 94 do exactly the same in operation and theory as that thus far described. This half of the circuit connects to the other winding of the servo motor which provides the power to drive the motor in the opposite direction. Resistors 96, 97 and capacitors 98, 99 prevent false turn "on" of the TRIAC by reducing the voltage surges appearing at these points during operation. Resistor 100 adjusts the current through the charging circuit of both the unijunction oscillators and consequently the sensitivity of the overall servo amplifier. Other differential amplifier gain control schemes and time constants to prevent servo motor oscillation or hunting may be employed here to further refine the circuits.

The variable AC power output circuit is basically the same as one half of the servo motor circuit explained above. The input 77 is connected to ground and the decommutated control signal is applied to input 76. In this arrangement transistors 93 and 94 and their associated components are not in use. Only one output, that of transistor 90, provides the variable AC power control. The TRIAC transistor anode and cathode connect in series with the load and AC power source. Again it is sometimes necessary to isolate the AC power circuit from the control circuit. In such a case an isolation transformer is used to couple the gate signal from transistor 86 to the gate cathode of the TRIAC 90.

Figure 13:
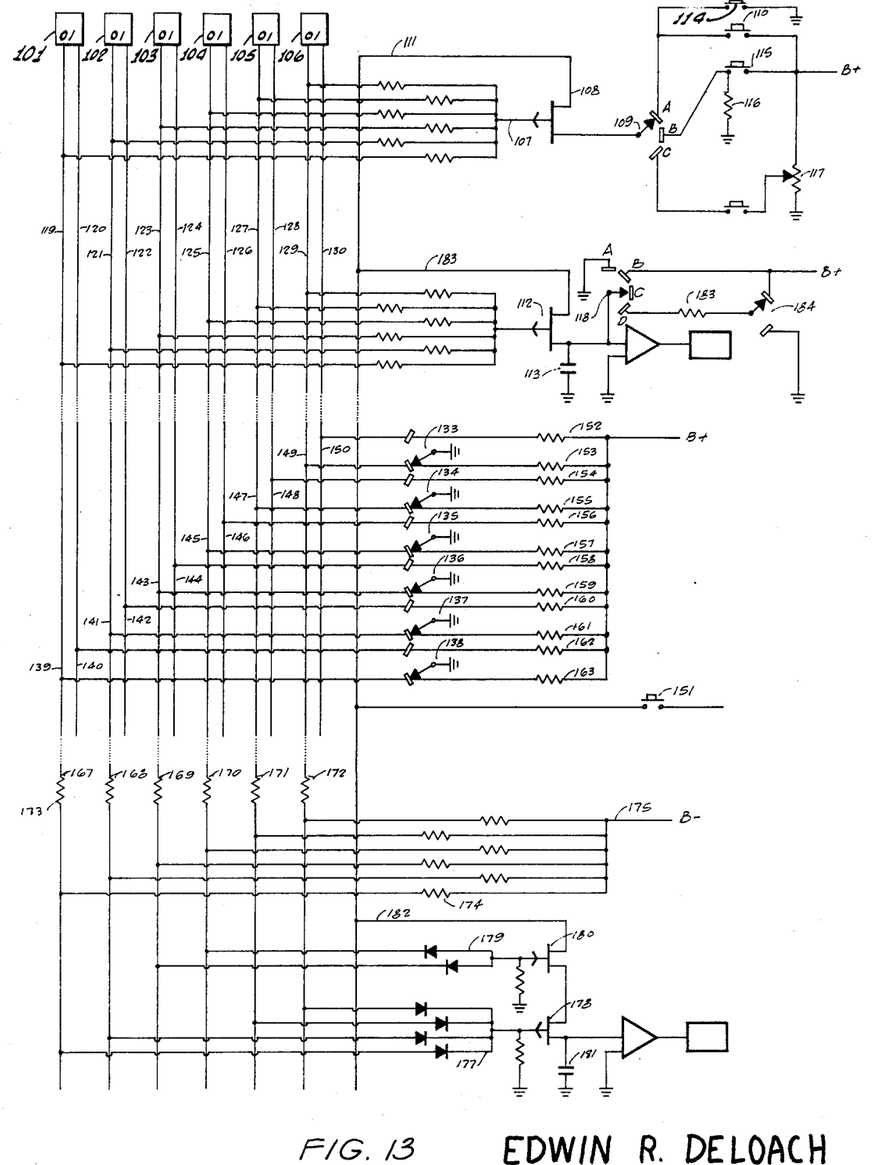
FIG. 13 is a schematic diagram illustrating various control and wiring arrangements possible with the output control circuits and of a schematic diagram of a novel commutating-decommutating circuit of fewer input connections.

As mentioned above the output circuits can be used with the multiplex system thus far described or in other arrangements where control is possible by punch tape, computer output circuits, other output and commutator circuits and even manually operated switches. FIG. 13 illustrates the interconnecting wiring diagram of these various schemes. The ripple counters 101, 102, 103, 104, 105 and 106 provide an output at the "0" and "1" circuits so that, when the "1" line is energized, the "0" line is at ground potential and vice versa. The resistor AND gate of the FET 108 is connected to these lines utilizing one of the 64 combinations possible. When the binary counters reach the combination that provides no output or ground potential to all the resistors of the AND gate, the commutation transistor 108 turns "on" providing a current path from the drain where a signal is applied to the common signal line 111 at the source terminal. Now assuming the switch 109 is in position A and the push button switch 110 is pressed, current will then flow from the voltage source through the switches 110 and 109 through the commutator transistor 108 to the common multiplex signal line 111. Now assuming the output circuit of transistor 112, perhaps located some distance away, has its resistor AND gate connected to the same code as transistor 108 circuit. In this case transistor 112 is in conduction at the same moment transistor 108 is and of course applies the same voltage seen at switch 110 to the capacitor 113. This voltage then controls the output circuit as described in the output circuit operation above. It should be understood that only the output circuits connected to the same code as the transmitting circuit will be affected an of course controlled. There are several ways that the control signal may be applied to the transmitting commutator circuit. For example, assuming that circuit 112 is the AC power type output circuit of FIGS. 8 and 10, and further assuming that the output of this circuit applies AC power directly to a motor device, pressing push button switch 110 momentarily turns the motor on. The motor continues to run even after the button is released. The charge on capacitor 113 is retained, keeping the motor running indefinitely.

If switch 114 is pressed, a current path is provided from the capacitor 113 through the transistor 112 and 108 during the next commutator cycle, which in turn discharges the capacitor at the ground connection of switch 114. In this way the motor is shut off and remains off. Now assuming switch 109 is in the B position, pressing of switch 115 provides an "on" signal to the motor as occurred when the switch 109 was in position A except in this case releasing of the switch shuts off the motor because of the discharge path of capacitor 113 provided by resistor 116. If switch 109 were placed in position c, a variable voltage could be transmitted as taken from the potentiometer 117 or some other variable DC signal voltage source. This arrangement would be useful for positioning servo motors or providing variable power to a remote load. Additionally this arrangement would be useful for transmitting information from remotely located transducers or thermocouples, photo cells, pressure transducers and the like to a control room where they could be displayed on separate read out meters. This arrangement would only require the circuit of transistor 118 as a transmitting commutator and a variable DC output circuit to decommutate the signal and drive a panel meter or other read out device. It is possible to use a second AC output circuit like that of transistor 112 to drive a monitor lamp to indicate operation of the motor. When the motor operates, the charge on capacitor 113 would be the same as the capacitor of the "monitor" output circuit. In this way, should the motor be operated from the location of circuit 108 or by the manual control override switch 118 located at the motor, the monitor would so indicate. Other control arrangements possible for the motor are provided as illustrated by the various positions of switch 118. The A position would override any command transmitted by the control circuit of transistor 108 by providing a direct short across the capacitor 113, thus turning the motor off and keeping it off. Position B would turn the motor on and keep it on. Position C would put the system back to remote control operation by control signals transmitted from the circuit of transistor 108. Position D would allow operation of the motor by a switch 184 that is located at the motor. The motor, for example, could be a blower motor controlled by a thermostatic switch with one important difference—position D would then allow the signal of transistor circuit 108 to override the thermostat generated command. In this manner transistor control circuit 108 would have priority of control. This is possible because resistor 183 passes enough current to control the output circuit but not enough to override current transmitted from transistor 108. It should be noted that with all these control possibilities the monitor circuit mentioned earlier would always indicate the true status of the motor as either "on" or "off."

In the foregoing description counters 101, 102, 103, 104, 105 and 106 have been operating continuously so that each circuit is scanned many times each second. These counters driven by a clock source are all that is necessary for the functions thus far described in connection with FIG. 13. It is noteworthy that any binary coding device may be used to scan the circuits 119 through 130 in place of the ripple counters 101 through 106. However it is possible to provide the control functions of circuits 108 and 112 without a binary scanning device or ripple counters at all. This is possible if the code for the channel being interrogated is set in the switches 133 through 138 as illustrated in FIG. 13. In such cases the conductors 139 through 150 are connected to conductors 119 through 130, respectively. Thus with the switches 133 through 138 in the position illustrated, the commutator transistors 112 and 108 would be turned "on." The same functions and versitility already mentioned would be possible for that particular channel. Then the next channel to control could be set in the switches and the control applied by switch 151. In this way the channels of interest could be interrogated as needed or scanned by mechanically switching the switches through the binary code. In this arrangement the commutator transmitting circuit of transistor 108 would not be used. However the various modes of control as illustrated by the circuit of switch 109 could be used by connecting this switch to the push button switch 151.

Another suitable control arrangement operation on this principle would be that provided from a punched tape. A punch tape reader could provide the switch circuits of 133 through 138 and switch 151. In this way a numerical tape control system would be created where the program is punched out on a paper tape. In this arrangement an upper case letter code of a Flexwriter could be assigned to a channel to turn on the output circuit and the lower case letter to turn the circuit off. Additionally a channel can be assigned the function to stop the tape reader after a set of commands are given to await some mechanical condition to occur in the equipment being controlled, as for example awaiting a temperature to reach a certain level. Then a command could be generated by a thermostat which energizes the tape reader to continue the program. The resistor array 152 through 163 is necessary to provide a B+ potential in all lines not shorted to ground by switches 133 through 138. It should be understood that the ripple counters would not be used in a punch tape control or the switch control arrangement of 133 through 138.

The output circuits may be used to reduce the amount of control wire and associating materials in an installation wherein a central location is provided to control remotely located motors, lamps, heaters, solenoids and the like or where a circuit like that of transistor 107 is used to transmit data from some means located at some remote point to the central location.

As can be seen from the explanation thus far 64 circuits may be controlled by the 12 conductors 119 through 130 and having common line 111. By adding two more wires and another ripple counter stage, the number of circuits which can be controlled may be doubled.

However, for further economy, further reduction of the wiring to the output circuits is possible. This may be accomplished as illustrated by the schematic of transistor 180–181 of FIG. 13, wherein conductors 140, 142, 144, 146, 148 and 150 are connected with conductors 167, 168, 169, 170, 171 and 172, respectively. In this case resistors 173 and 174 become a voltage divider for the binary code signal of either zero or +40 volts and the −20 volt point 175. In this way the code signal appearing at point 176 is either +10 volts or −10 volts for a binary code voltage of +40 volts or 0 volts, respectively. In this embodiment the diode type AND gate 177 could be used to gate transistor 178 and diodes 179 to gate transistor 180. In this way the gate of transistor 178 would be zero potential when the signals at the gate 177 are all negative which would turn the transistor "on" or into conduction. The other half of the circuit, transistor 180 and gate 179, would operate in the same manner but with opposite polarity at the gate. In all other substantial regards the output circuit would be the same wherein capacitor 181 holds the signal as does capacitor 113 and line 182 connects to the common signal line 111 as does 183 of transistor circuit 112.

Advantages and Attributes of the Present Invention

The systems of the present invention have, inter alia, the following advantages and attributes:

1. Use of magnetic tape or punched tape in numerical control applications is possible.

2. Magnetic tape programs can be made by first recording the manual operation as it is actually and manually being done.

3. Timing between commands can be "replayed" with the original time spacing between commands as recorded.

4. Audio instructions can be given on a second track of the tape recording paralleling the "numerical" tape program.

5. Stop command can be used to stop the magnetic tape program after a set of commands has been given. These commands will be "remembered" by the system and continually applied to the output. This would conserve tape and allow time for any desired mechanical operation to take place. After completion of this operation, a signal is supplied to the tape recorder to continue the program.

6. Magnetic tape programs can be revised, changed or corrected during operation of the program by manually overriding any commands. This change is automatically corrected on the program without modifying or losing any data on either multiplex channels.

7. Analog signals for any channel can be recorded or several channels can be grouped together to provide a parallel binary coded output. This binary code could then be converted to analog voltages of extreme accuracy whenever the application may so require. However, a single channel may be used to record analog signals where the application does not require complete accuracy.

8. The simplified circuitry which is used in the present invention permits a great reduction in cost.

9. Using the magnet tape modulation scheme of this system permits the use of conventional tape recorders and eliminates the need for instrumentation type tape recorders and complex modulating schemes. Additionally this modulating scheme uses much less tape for recording a given amount of data than other types of modulation schemes.

10. The system can be used simply as a telemetry tape recording system where many channels of data can be stored on a single track of tape.

11. The system can be used to transmit many channels of analog or digital data over a single low grade circuit 25, for example, a telephone line or radio transmitter, or used for remote control of complex operations.

12. Another very important advantage of the present invention is its simplified output circuitry. For AC power control the circuit of the present invention composed of three transistors, replaces the AND gate, commutator, memory (usually a flip-flop) buffer amplifier and the AC power relay normally found in the systems of the prior art. This circuit tremendously reduces the cost by reducing the number of components of the system, not to mention reduced size and complexity.

13. Any combination of output circuits are possible with the magnetic tape system, i.e., fixed DC, fixed AC, variable AC power and servomotor control output circuits. Fixed DC and AC output circuits are possible with the punched tape system only and the other ouptut circuits functions may also be provided if a binary to analog converter is included. In the latter case a channel would be used for each bit of the binary code, but the elimination of the multiplex circuitry necessary for the magnet tape system would be realized.

14. The fixed AC and DC output circuits could be used independently of the multiplex system as binary coded switches. By applying the proper code the "switch" would turn on and remain on until the code for an "off" condition was given. In this way as many as 64 remotely located switches could be controlled with only seven wires to carry the signals or more than 1,000 switches could be operated over a single 11 wire circuit. This would greatly reduce the amount of wiring, conduit, labor and engineering time in applications where remotely located motors, valves, lights, heaters and other AC controlled devices must be controlled from a central location. In such installations as electric power generating plants and petroleum refineries, the savings could be tremendous. Reducing the amount of wiring in aircraft applications would also be an important application. Noteworthy too is the fact that these switches could be operated directly by punch tape control, computer control or other binary input means, in addition to manual control from a control room or central location.

15. Another advantage of the output circuit of the present invention is its lack of radio interference and its noiseless operation. This is particularly advantageous in meterology and military application.

I claim:

1. A signal multiplex coding-decoding system comprising:

a coding circuit including a clock circuit and a binary counting circuit of two or more stages, said clock circuit generating timing pulses applied to said binary counting circuit; said binary counting circuit's second and succeeding stages generating a binary output which is fed to a multiple number of commutator circuits; said commutator circuits comprising an AND gate and field effect transistor; said commutator commutating during a time interval enabled by a single binary code as determined by said code connected to said AND gate of said commutator; a signal generated by said commutating circuit being applied to a modulating circuit; said binary counting circuit first stage providing a signal applied to said modulating circuit; said modulating circuit alternately gating the signal generated by said commutator circuit; the signal derived from said binary counting circuit first stage providing the signal to operate the gates of said modulating circuit whereby the output of said modulating circuit is inverted in polarity of voltage through one of the gates of said modulating circuit; and a decoding circuit comprising the identical circuits of the coding section and additionally comprising: an input circuit which feeds the input signal to a clock synchronizing circuit; said clock synchronizing circuit providing a signal generating from said input circuit and applying this signal to said clock circuit whereby said clock circuit frequency is thus synchronized with said input signal; a second signal provided from said input circuit to a frame synchronizing circuit whereby said frame synchronizing circuit is generating a signal which sets said binary counting circuits to a count corresponding to a reference pulse channel position; said input circuit applying the input signal to the output of said modulator circuit whereby demodulation occurs, providing a demodulated output.

2. The apparatus of claim 1 wherein said clock circuit includes a unijunction transistor; the emitter of said unijunction transistor connecting to the cathode of a rectifier diode; the anode of said rectifier diode connecting to a time constant circuit comprising a resistor and capacitor; said resistor connecting to a source of voltage; said capacitor connecting to a ground reference point; said capacitor discharging through said diode; and said emitter and base of said unijunction transistor, a signal is being generated and providing the clock output; said frame synchronizing circuit comprising one or more amplifier stages biased into cutoff; the output of the final stage of said amplifier stages being connected to the base of a frame synchronizing circuit unijunction transistor which in turn is connected to said time constant of the clock circuit through a frame synchronizing circuits rectifier diode; whereby a signal on said amplifier stages triggers said frame synchronizing circuit into conduction, discharging the stored charge on said time constant circuit capacitor providing an output for frame synchronization.

3. The apparatus of claim 1 wherein said clock synchronizing circuit comprises: two transistors, first transistor emitter connecting to a second transistor emitter, base of said first transistor connected to the ends of a transformer winding, said second transistor connecting to the opposite end of said transformer winding a center top of said transformer winding connecting to a variable voltage supply, collectors of said first transistor connecting to a first rectifier diode, collector of said second transistor connecting to a second rectifier diode, said first rectifier diode anode terminal connecting to second rectifier anode terminal, said anode terminals connecting to the cathode of a third rectifier diode, said third rectifier diode connecting to a grand reference point, junction of all three of said rectifier diodes connected to resistance, and said resistance connecting to a source of voltage.

4. The apparatus of claim 1 wherein said modulator circuit comprises two field effect transistors, said transistor source terminals connected in common to a signal line, said transistor drain terminals connected to opposite ends of a transformer winding having a center top of said transformer winding connected to a ground reference point and the gates of said field effect transistors connected to individual terminal points where application of a modulating signal is applied and whereby a signal can be applied into a secondary winding of the transformer and extracted at the common connection of said source terminals or vice versa.

5. The apparatus of claim 1 wherein said commutator circuit comprises a resistor array of which all connections are common on one end and connects to the gate terminal of a field effect transistor of which the source terminal of said field effect transistor connects to a point common with all commutator circuits and where the drain terminal of said field effect transistor connecting to a terminal point.

6. The circuit of claim 5 wherein a second field effect transistor is connected so that the gate of said second field effect transistor is connected to the gate of said field effect transistor of claim 5; the drain of said second field effect transistor is connected to the drain of said field effect transistor of claim 5; the source terminal of said second field effect transistor connection common to all other second field effect transistors of all other commutator circuits.

7. The circuit of claim 5 wherein said drain terminal connects to a direct current control circuit which consists of: a capacitor connected from said drain terminal to a ground reference point; a resistor which connects said drain terminal with the gate terminal of a SCR transistor ; where said SCR anode terminal connects to a load that is connected to a source of interrupting direct durrents; a resistor connecting to said SCR cathode and the other end of said resistor connecting to a ground reference point; a second resistor connecting to said SCR cathode and the other end of said second resistor connecting to said drain terminal so application of a signal of the drain terminal turns said SCR transistor into conduction; whereby once conducting will restore energy taken from said capacitor which connects from said drain terminal to a ground reference point.

8. The circuit of claim 7 wherein the cathode of said SCR is connected to the gate of a TRIAC transistor whereby when said SCR transistor is conduction a signal is applied switching said TRIAC transistor on energizing a load whereby said load connected from said TRIAC transistors anode to a source of AC power.

9. The apparatus of claim 1 where said commutating circuit comprises a first diode array on which all connections are common on one end and connects to the gate terminal of a field effect transistor and a second diode array of opposite polarity commonly connected at one end connects to its gate terminal of a second field effect transistor of opposite polarity; the drain terminals of said first transistors connected to the source terminal of the second; drain terminal of said first transistor connects to a terminal point where a signal can be applied during decommutation; the source terminal of the second transistor connects to a terminal point; whereby each diode of said first diode array connects to terminals of which is applied a control signal and where each diode of said second diode array connects to terminals of which is applied a control signal.

* * * * *